United States Patent [19]
Harmetz et al.

[11] 3,876,703
[45] Apr. 8, 1975

[54] PURIFICATION OF P-AMINOPHENOL
[75] Inventors: Ronald Harmetz, Dover; Donald Carl Ruopp, Belleville; Bernard Beau Brown, Westfield, all of N.J.
[73] Assignee: CPC International Inc., Englewood Cliffs, N.J.
[22] Filed: June 5, 1973
[21] Appl. No.: 367,263

[52] U.S. Cl. ................................. 260/575
[51] Int. Cl. ............................. C07c 91/44
[58] Field of Search ........................... 260/575, 571

[56] References Cited
UNITED STATES PATENTS
3,694,508  9/1972  Baron et al. ...................... 260/575
3,703,598  11/1972  Baron ................................ 260/575
3,845,129  10/1974  Reid ................................... 260/575

Primary Examiner—Lewis Gotts
Assistant Examiner—S. P. Williams
Attorney, Agent, or Firm—Salvatorie C. Mitri

[57] ABSTRACT

A method for the purification of p-aminophenol. The impure p-aminophenol is dissolved in an aqueous acid solution and extracted with nitrobenzene.

17 Claims, No Drawings

PURIFICATION OF P-AMINOPHENOL

SPECIFICATION

The present invention relates to the preparation of p-aminophenol of high purity. More specifically, it relates to a method by which crude p-aminophenol is purified. Still more specifically, it provides a method for the purification of p-aminophenol which is obtained by the catalytic hydrogenation of nitrobenzene.

BACKGROUND OF THE INVENTION p-Aminophenol is a readily available chemical and is used as a photographic developer. It also is an intermediate in the manufacture of sulfur and azo dyes, which are especially useful in dyeing hair, furs and feathers. A principal use is as the raw material from which p-acetaminophenol is prepared; p-acetaminophenol is used as an analgesic, and as an antipyretic; also, in the manufacture of dyes and other photographic chemicals.

The principal method by which p-aminophenol may be prepared involves the reduction of nitrobenzene. The reaction proceeds by way of the intermediate formation of phenylhydroxylamine, as follows:

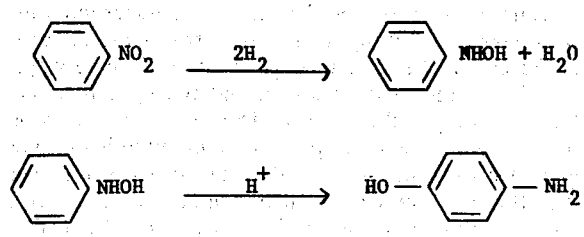

The phenylhydroxylamine is not isolated and its conversion to the desired p-aminophenol is accomplished by means of strong acid, usually sulfuric acid. The use of zinc dust and ammonium chloride to accomplish this type of reduction is shown in U.S. Pat. No. 2,132,454 (Bassford). The catalytic hydrogenation of nitrobenzene in the presence of a strong acid such as sulphuric acid, to prepare p-aminophenol, is shown in U.S. Pat. No. 2,198,249 (Henke et al). Hydrogen pressures of from about 400 to about 500 lbs. per sq. inch gauge are preferred, as are temperatures within the range of 135°C and 155°C. High pressures are stated to favor the formation of aniline rather than p-aminophenol.

In U.S. Pat. No. 2,765,342 (Spiegler), nitrobenzene is reduced catalytically to p-aminophenol under conditions which include a partial pressure of hydrogen less than 760 mm. of mercury and the careful addition of nitrobenzene to the reaction mixture such that at no time does the amount of unreacted nitrobenzene exceed its solubility in the reaction mixture. British Pat. No. 856,366 corroborates this teaching.

U.S. Pat. No. 3,383,416 (Benner) deals with the problem of recovery of the expensive catalyst (platinum) from the hydrogenation of nitrobenzene to obtain p-aminophenol. It accomplishes this objective by halting the reaction when about 85–95% nitrobenzene haa reacted. At this point, the nitrobenzene contains essentially all of the catalyst and is present as a separate layer in the reaction mixture and can be separated easily from the aqueous layer. U.S. Pat. No. 3,535,382 (Brown et al) teaches the use of a non-ionic surfactant in the reaction mixture to facilitate the solubilization of the nitrobenzene and thus avoid the necessity of having to add it portionwise.

In all of these methods, however, the p-aminophenol which is obtained as the product is relatively impure and requires substantial purification before it can be used either as such or as an intermediate in the preparation of other materials. According to U.S. Pat. No. 3,694,508 (Baron et al), the impurities include quinones, quinonimines, meriquinonimines, azoxybenzene, aniline, p-aminodiphenylamine, 4hydroxy-4$^1$-aminobiphenyl derivatives, indophenol deriviatives, p-hydroxydiphenylamine, 4,4$^1$-diaminodiphenylether and 4-(p-hydroxy anilino)-naphthoquinone-(1,2). This patent teaches the purification of such crude p-aminophenol by extraction of an acid solution of the p-aminophenol with a lower alkyl acetate such as ethylacetate, then recovery of the desired p-aminophenol by adjusting the pH to 6.5 – 7.5 and cooling to a temperature below 30°C whereupon the purified p-aminophenol is precipitated. The resulting p-aminophenol is said to be sufficiently pure to permit the preparation of N-acetyl p-aminophenol which meets all of the National Formulary specifications for this product. A somewhat similar method is shown in U.S. Pat. No. 3,658,905 (Daunis et al) except that the extracting solvent is a liquid aliphatic, cycloaliphatic or aromatic ketone. The ketone solvent is effective to remove substantially all organic impurities except 4,4$^1$ and to greatly reduce the amount of this impurity. It is this 4,4$^1$-diaminodiphenylether which, except for aniline, is the principal impurity present in p-aminophenol. Unfortunately, it is not easily removed by purification methods of the prior art.

It is a principal object of the present invention to provide a method for the purification of p-aminophenol.

It is another object of the present invention to provide a process for the purification of p-aminophenol which has been preparaed by the reduction of nitrobenzene.

It is another object of the present invention to provide a process for the purification of p-aminophenol which is more economical and convenient than those of the prior art.

It is another object of the present invention to provide a process for the separation of 4,4$^1$diaminodiphenylether from p-aminophenol.

SUMMARY OF THE INVENTION

These and other objects of the invention are accomplished herein by a method for purifying crude p-aminophenol comprising preparing a mixture of an aqueous solution of the crude p-aminophenol and nitrobenzene, adjusting the pH of the mixture to between 4.5 and 7.5, and separating a nitrobenzene phase. The method is particularly adaptable to the purificatioin of p-aminophenol which results from the catalytic or electrolytic hydrogenation of nitrobenzene in an aqueous, non-oxidizing acid. Preferably, the mixture should be cooled to about 30°C before separating the nitrobenzene phase.

In one embodiment of the invention the pH is adjusted to at least about 6.0 whereupon the p-aminophenol precipitates and is separated, e.g. by filtration. Alternatively, the pH is fixed at some lower level, say 5.0, so as to avoid precipitation of the p-aminophenol, then the nitrobenzene phase is separated. This latter embodiment is useful in the preparation of p-acetaminophenol.

It will be seen that the above method is merely an extraction of the crude p-aminophenol with nitrobenzene, which is the raw material from which the p-aminophenol is prepared. Thus, the nitrobenzene serves two purposes and thereby affords a considerable savings in cost as well as convenience. Furthermore, the nitrobenzene can be recycled back into the process after suitable purification.

A preferred embodiment of the invention involves incorporation of the method into the preparation of p-aminophenol from nitrobenzene, i.e., simply by halting the reaction while there is still enough unreacted nitrobenzene in the reaction to serve as the extracting solvent. Alternatively, the p-aminophenol can be prepared and isolated as in the prior art, then dissolved in aqueous acid, the acid solution treated with nitrobenzene, the pH adjusted to between 4.5 and 7.5, and the nitrobenzene phase separated.

The amount of nitrobenzene to be employed may vary from as little as about 25 percent of the p-aminophenol to as much as 5 times the amount of p-aminophenol. Thus, if the method of the preferred embodiment above is employed, then the reaction will be stopped when no more than about 80 percent, for example, of the nitrobenzene is reacted, so that at least 20 percent (about 28 percent of the resulting p-aminophenol) will remain to serve as the extracting solvent. On the other hand, it is not practical to use more than the stated maximum of nitrobenzene, i.e., no advantage is obtained thereby. Preferably, the amount of nitrobenzene is about 50 percent of the amount of p-aminophenol.

The aqueous acid solution of p-aminophenol is prepared by mixing the p-aminophenol with an aqueous, non-oxidizing acid such as sulfuric or phosphoric acid at room temperature up to the reflux temperature of the mixture. Generally, the more concentrated the p-aminophenol, the higher the temperature required to solubilize it in the aqueous acid solution.

The pH of the aqueous acid solution of the crude p-aminophenol is adjusted to a value between 4.5 and 7.5 by the addition of any alkaline agent such as ammonia, calcium hydroxide, sodium hydroxide and the like; however, ammonia or ammonium hydroxide are preferred. It is advisable to carry out the adjustment of pH in an inert atmosphere so as to reduce the likelihood of discoloration of the p-aminophenol. When this is the case, nitrogen is a preferred inert atmosphere.

the non-oxidizing acid may be either sulfuric acid or phosphoric acid.

The invention is illustrated by the following examples which, however, are not to be taken as limiting in any respect:

EXAMPLE 1

A jacketed vessel, equipped with a stirrer, is charged with 1000 ml. of water, 290 g of 96 percent sulfuric acid (2.84 moles), 4.92 g of 1 percent platinum on charcoal, 246 g of nitrobenzene (2moles) and 2.5 g of the non-ionic surfactant produced by condensation of 1 mole of nonylphenol with 6 moles of glycidol.

After the charged vessel has been sealed and purged with hydrogen, it is heated to a temperature of 86°–88°C and maintained at that temperature under a slight pressure (20-30 mm.) of hydrogen. After completion of the hydrogenation, the vessel is purged with nitrogen and the reaction mixture is filtered to recover the catalyst. The filtrate is cooled to 60°–70°C and mixed with 123 g of fresh nitrobenzene. About 370 g of aqueous 28 percent ammonium hydroxide is then added, while stirring under a blanket of nitrogen so that the pH is raised to a value of 6.3 – 6.5. The precipitated p-aminophenol is filtered and washed with 100 g of nitrobenzene and two 200-ml portions of water. The pure p-aminophenol weighs 172 g (79 percent of theory).

The above p-aminophenol is added to 1000 ml of water containing sufficient sulfuric acid to dissolve it as its sulfate salt at 90°C. A small quantity of nitrobenzene remaining from the washing operation is steam distilled away after which the solution is treated with active charcoal and filtered at 90°–95°C. After neutralization of the filtrate (to a pH of 7.0) with ammonia, the p-aminophenol is acetylated in the usual manner with acetic anhydride to yield the N-acetyl aminophenol which meets all National Formulary specifications. In the absence of the nitrobenzene extraction step the resulting N-acetyl aminophenol is not sufficiently pure to meet many of these specifications.

EXAMPLE 2

Example 1 is repeated, leaving enough unreacted nitrobenzene (about 40 ml) so that a two phase mixture is present in the final product mixture. The reaction vessel is purged with nitrogen and the mixture is filtered to recover the catalyst. The resulting mixture is treated with aqueous 28 percent ammonium hydroxide in a nitrogen atmosphere, with agitation, so as to adjust the pH to 6.5. This causes the p-aminophenol to precipitate. It is filtered and washed as above, then dried. The yield is 132 g (75 percent of the theory, based on nitrobenzene consumed). Conversion of N-acetyl aminophenol as above yields a product which meets all National Formulary specifications.

EXAMPLE 3

A mixture of 80 ml of nitrobenzene and 1000 ml of an aqueous sulfuric acid solution of 170 g of impure p-aminophenol (containing 1–2 percent of 4,4¹-diaminodiphenylether) obtained by electrolytic reduction of nitrobenzene, is prepared. To this mixture, at 60°C, there is added sufficient ammonium hydroxide to raise the pH to 5.0. The lower nitrobenzene layer is separated. The residual aqueous layer is heated at 85°–90°C for 1 hour with active carbon, then filtered at 95°C. The filtrate is acetylated to yield p-acetaminophenol which meets all National Formulary specifications.

p-Aminophenol can also be prepared by electrolytic reduction of nitrobenzene in hot aqueous sulfuric acid. The process involves the intermediate formation of phenylhydroxylamine, as in the other reduction processes referred to earlier herein, and the resulting p-aminophenol product also contains relatively high proportions of aniline and 4,4¹-diaminodiphenylether. Such impure product is readily susceptible to purification by the method of this invention.

EXAMPLE 4

A mixture of 34 ml of nitrobenzene and 200 ml of an aqueous sulfuric acid solution of 34 g of impure p-aminophenol (containing 4–6 percent 4,4¹-diaminodiphenylether), obtained by catalytic reduction of nitrobenzene, is prepared. To this mixture, at 60°C, there is added sufficient ammonium hydroxide to raise the pH to 6.5. The precipitated p-aminophenol is filtered and washed as above. Conversion to p-acetaminophenol as above yields a product which meets all National Formulary specifications.

All parts herein are by weight unless otherwise expressly stated.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. An improved method for purifying crude p-aminophenol that is obtained from a mixture of an aqueous, non-oxidizing acid solution of the crude p-aminophenol and nitrobenzene, said improvement comprising adjusting the pH of the mixture to between 4.5 and 7.5 and separating from said adjusted mixture a nitrobenzene phase and a purified p-aminophenol phase.

2. The method of claim 1 wherein the mixture of an aqueous solution of crude p-aminophenol and nitrobenzene is a product mixture obtained from the catalytic hydrogenation of nitrobenzene in said aqueous acid solution.

3. The method of claim 1 wherein the pH of the mixture is adjusted to between 4.5 and 6.0.

4. The method of claim 1 wherein the pH of the mixture is adjusted to between 6.0 and 7.5.

5. The method of claim 1 wherein the amount of nitrobenzene in the mixture is about 50 percent of the amount of p-aminophenol.

6. The method of claim 1 wherein the pH is adjusted by the addition of aqueous ammonium hydroxide.

7. The method of claim 1 wherein the adjustment of pH is carried out in an inert atmosphere.

8. An improved method for separating 4,4$^1$-diaminodiphenylether from p-aminophenol obtained from an aqueous non-oxidizing acid solution of said materials, said improvement comprising mixing nitrobenzene with said solution, adjusting the pH of the mixture to between 4.5 and 7.5 and separating from said adjusted mixture a nitrobenzene phase and a purified p-aminophenol phase.

9. An improved method for purifying crude p-aminophenol prepared by the catalytic hydrogenation of nitrobenzene in aqueous sulfuric acid, said improvement comprising preparing a mixture of an aqueous sulfuric acid solution of the crude p-aminophenol and nitrobenzene, adjusting the pH of the mixture to between 4.5 and 7.5 and separating from said adjusted mixture a nitrobenzene phase and a purified p-aminophenol phase.

10. The method of claim 8 wherein the pH of the mixture is adjusted to between 4.5 and 6.0.

11. The method of claim 8 wherein the pH of the mixture is adjusted to between 6.0 and 7.5.

12. The method of claim 8 wherein the amount of nitrobenzene in the mixture is about 50 percent of the amount of p-aminophenol.

13. The method of claim 8 wherein the pH is adjusted by the addition of aqueous ammonium hydroxide.

14. The method of claim 9 wherein the pH of the mixture is adjusted to between 4.5 and 6.0.

15. The method of claim 9 wherein the pH of the mixture is adjusted to between 6.0 and 7.5.

16. The method of claim 9 wherein the amount of nitrobenzene in the mixture is about 50 percent of the amount of p-aminophenol.

17. The method of claim 9 wherein the pH is adjusted by the addition of aqueous ammonium hydroxide.

* * * * *